United States Patent
Patel et al.

(10) Patent No.: US 11,855,559 B2
(45) Date of Patent: Dec. 26, 2023

(54) DUAL SATURABLE REACTOR POWER SUPPLY

(71) Applicant: Hamilton Sundstrand Corporation, Charlotte, NC (US)

(72) Inventors: Dhaval Patel, Schaumburg, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 105 days.

(21) Appl. No.: 17/520,872

(22) Filed: Nov. 8, 2021

(65) Prior Publication Data

US 2023/0145101 A1 May 11, 2023

(51) Int. Cl.
*G05F 1/32* (2006.01)
*H02P 11/04* (2006.01)
*H02M 7/06* (2006.01)
*H02P 9/32* (2006.01)

(52) U.S. Cl.
CPC ............... *H02P 11/04* (2013.01); *G05F 1/32* (2013.01); *H02M 7/06* (2013.01); *H02P 9/32* (2013.01)

(58) Field of Classification Search
CPC .... G05F 1/32; H02M 7/06; H02P 9/32; H02P 11/04
See application file for complete search history.

(56) References Cited

U.S. PATENT DOCUMENTS

| | | | | |
|---|---|---|---|---|
| 3,273,044 A | * | 9/1966 | Clarke | H02M 5/00 363/44 |
| 3,422,341 A | * | 1/1969 | Toshio | H02M 7/06 363/91 |
| 4,949,235 A | * | 8/1990 | Barnet | H02M 7/06 363/92 |

(Continued)

FOREIGN PATENT DOCUMENTS

| | | | | |
|---|---|---|---|---|
| DE | 3306094 A | * | 8/1984 | G05F 1/38 |
| DE | 4229303 B4 | | 3/2004 | |

(Continued)

OTHER PUBLICATIONS

Catuogno Guillermo R., et al.: "Fault-Tolerant Inverter for Power Flow Control in Variable-Speed Four-Wire Permanent-Magnet Generators", IEEE Transactions on Industrial Electronics, IEEE Service Center, NJ., vol. 62, No. 11, Nov. 1, 2015, pp. 6727-6736.

(Continued)

*Primary Examiner* — Harry R Behm
(74) *Attorney, Agent, or Firm* — Locke Lord LLP; Joshua L. Jones; Scott D. Wofsy

(57) ABSTRACT

A power supply system includes a first saturable reactor electrically connected to a first AC phase input, to a second AC phase input, and to a third AC phase input. The first saturable reactor is electrically connected to a first DC output. A second saturable reactor is electrically connected in parallel with the first saturable reactor to the first AC phase input, to the second AC phase input, and to the third AC phase input. The second saturable reactor is electrically (Continued)

connected to a second DC output. A reactor controller can be operatively connected to the first saturable reactor and to the second saturable reactor to regulate DC output voltage to the first and second DC outputs.

13 Claims, 2 Drawing Sheets

(56) References Cited

U.S. PATENT DOCUMENTS

| | | | |
|---|---|---|---|
| 5,349,257 A * | 9/1994 | Hernden | H02P 9/00 |
| | | | 310/156.28 |
| 6,684,639 B2 | 2/2004 | Ichinose et al. | |
| 7,262,521 B2 | 8/2007 | Dooley et al. | |

FOREIGN PATENT DOCUMENTS

| | | | |
|---|---|---|---|
| JP | 05056643 A * | 3/1993 | |
| JP | 2011004558 A | 1/2011 | |
| JP | 05349258 B2 | 11/2013 | |

OTHER PUBLICATIONS

Koczara W. et al.: "High Power Perfectgen for Three Wire DC Microgrid Application", 2015 IEEE 5th International Conference on Power Engineering, Energy and Electrical Drives (Powereng), May 11, 2015, pp. 548-464.

Extended European Search Report dated Mar. 14, 2023, issued during the prosecution of European Patent Application No. EP 22206167.3.

* cited by examiner

DUAL SATURABLE REACTOR POWER SUPPLY

BACKGROUND

1. Field

The present disclosure relates to power supplies, and more particularly to power supplies such as used to provide conditioned power to aircraft from onboard generators.

2. Description of Related Art

Aircraft 28V systems are typically sourced by a permanent magnet generator (PMG) and rectifier. One of the topologies that has been utilized in the past is a saturable reactor or magnetic amplifier to help maintain a constant voltage over the entire load and speed range.

Each PMG phase is connected to a diode. The output of each diode is fed into the reactor, which is controlled by a control winding. The output of the reactor is then filtered. The neutral of the PMG acts as the negative rail or return path for the circuit. The reactor topology is beneficial over current switching power supply topologies because it is more cost effective. Additionally, the reactor topology can withstand higher heat due to the reactor construction. One drawback that must be balanced with these benefits is that the topology only utilizes the positive half of the PMG output voltage. As a result, the PMG must be upsized to provide the necessary power.

The conventional techniques have been considered satisfactory for their intended purpose. However, there is an ever present need for improved systems and methods for power supplies. This disclosure provides a solution for this need.

SUMMARY

A power supply system includes a first AC phase input configured to connect to a first phase of a generator, second AC phase input configured to connect to a second phase of a generator, and a third AC phase input configured to connect to a third phase of a generator. A first saturable reactor is electrically connected to the first AC phase input, to the second AC phase input, and to the third AC phase input. The first saturable reactor is electrically connected to a first DC output. A second saturable reactor is electrically connected in parallel with the first saturable reactor to the first AC phase input, to the second AC phase input, and to the third AC phase input. The second saturable reactor is electrically connected to a second DC output. A reactor controller can be operatively connected to the first saturable reactor and to the second saturable reactor to regulate DC output voltage to the first and second DC outputs.

A neutral line can be configured to connect to a PMG neutral point, wherein the neutral line connects to a node between the first DC input and the second DC output. A first capacitor can be connected between the first DC output and the neutral line. A second capacitor can be connected between the second DC output and the neutral line. A node connected to the first capacitor, the second capacitor, and the neutral line can be connected to ground so a negative DC voltage can be output from the second DC output, and a positive DC voltage can be output from the first DC output. The second DC output can be connected to ground, and the node connected to the first capacitor, the second capacitor, and the neutral line can be configured to output an intermediate positive DC voltage, wherein the first DC output is configured to output a higher positive DC voltage than the intermediate positive DC voltage.

The first saturable reactor can connect to the first DC output through a first inductor, and the second saturable reactor can connect to the second DC output through a second inductor. A first impedance can connect a node between the first saturable reactor and the first inductor to ground. A second impedance can connect a node between the second saturable reactor and the second inductor to ground. A first grounded diode can connect the node between the first saturable reactor and the first inductor to ground, and can be oriented to impede current flowing to ground through the first diode. A second grounded diode can connects the node between the second saturable reactor and the second inductor to ground, and can be oriented to impede current flowing to ground through the second diode.

The first AC phase input can connects to the first saturable reactor through a first diode oriented to inhibit current from the first saturable reactor into the first AC phase input. The second AC phase input can connect to the first saturable reactor through a second diode oriented to inhibit current from the first saturable reactor into the second AC phase input. The third AC phase input can connect to the first saturable reactor through a third diode oriented to inhibit current from the first saturable reactor into the third AC phase input. The first AC phase input can connect to the second saturable reactor through a fourth diode oriented to inhibit current from the first AC phase input into the second saturable reactor. The second AC phase input can connect to the second saturable reactor through a fifth diode oriented to inhibit current from the second AC phase input into the second saturable reactor. The third AC phase input can connect to the second saturable reactor through a sixth diode oriented to inhibit current from the third AC phase input into the second saturable reactor.

The first saturable reactor can include a respective first reactor inductor for each of the first, second, and third AC phase inputs, and the first saturable reactor can include a respective control winding operatively associated with each of the respective first reactor inductors for controlling DC output voltage to the first DC output. The second saturable reactor can include a respective second reactor inductor for each of the first, second, and third AC phase inputs, and the first saturable reactor can include a respective control winding operatively associated with each of the respective second reactor inductors for controlling DC output voltage to the second DC output.

A permanent magnet generator (PMG) can include a first phase connected to the first AC phase input, a second phase connected to the second AC phase input, and a third phase connected to the third AC phase input. The PMG can include a neutral point connected between the first phase, second phase, and third phase of the PMG. The neutral point can be connected as a floating point between the first and second DC outputs.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
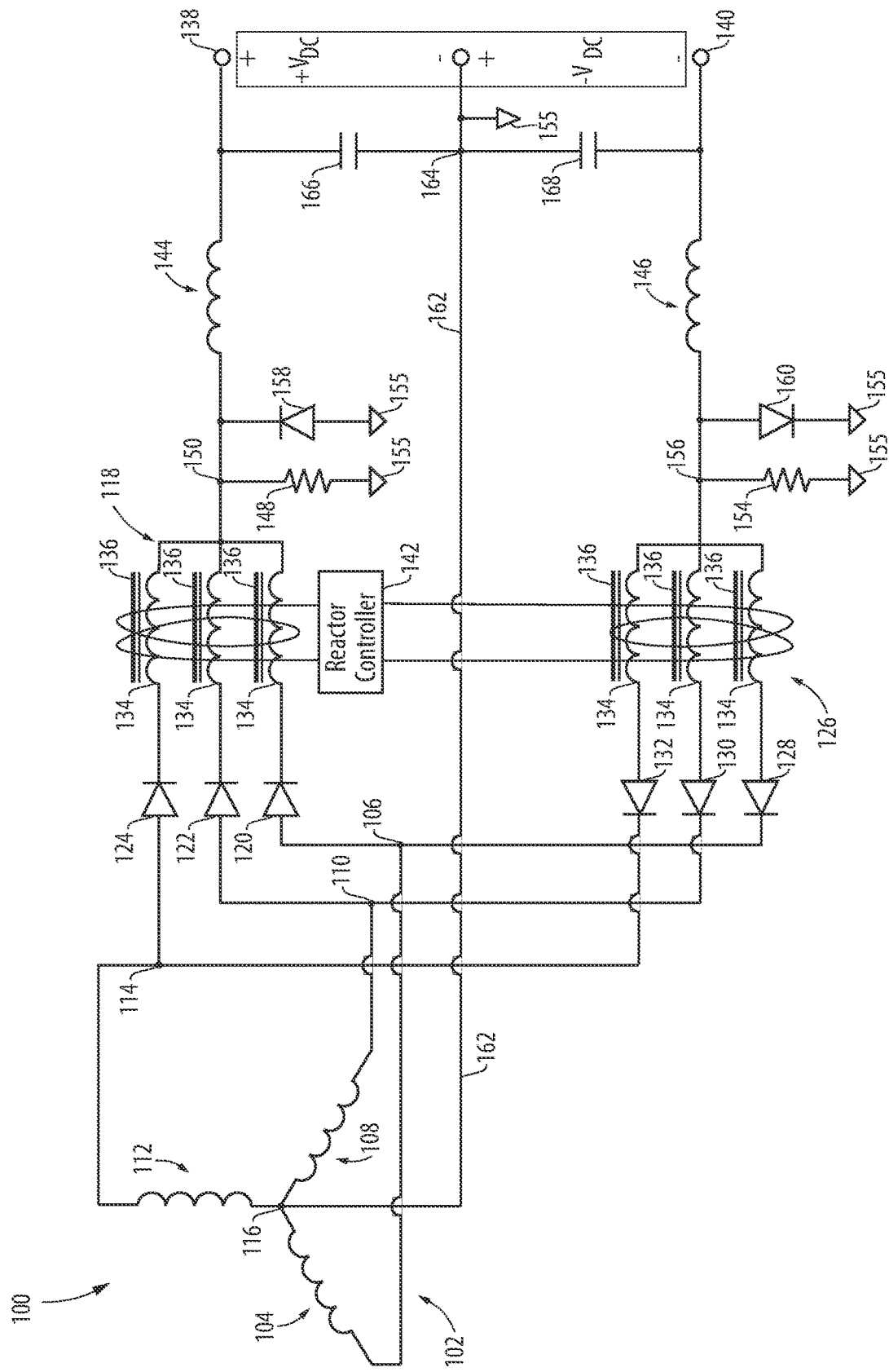
FIG. 1 is a schematic view of an embodiment of a system constructed in accordance with the present disclosure, showing the permanent magnet generator PMG and the two saturable reactors.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide direct current (DC) power from an alternating current (AC) generator, e.g. aboard an aircraft.

A permanent magnet generator (PMG) 102 includes a first phase 104 connected to the first AC phase input 106, a second phase 108 connected to the second AC phase input 110, and a third phase 112 connected to the third AC phase input 114. The PMG 102 includes a neutral point 116 connected between the first phase 104, second phase 108, and third phase 112 of the PMG 102.

The first AC phase input 104 connects to the first saturable reactor 118 through a first diode 120 oriented to inhibit current from the first saturable reactor 118 into the first AC phase input 106. The second AC phase input 110 connects to the first saturable reactor 118 through a second diode 122 oriented to inhibit current from the first saturable reactor 118 into the second AC phase input 110. The third AC phase input 114 connects to the first saturable reactor 118 through a third diode 124 oriented to inhibit current from the first saturable reactor 118 into the third AC phase input 114.

The second saturable reactor 126 is electrically connected in parallel with the first saturable reactor 118 to the first AC phase input 106, to the second AC phase input 110, and to the third AC phase input 114. The first AC phase input 106 connects to the second saturable reactor 126 through a fourth diode 128 oriented to inhibit current from the first AC phase input 106 into the second saturable reactor 126. The second AC phase input 110 connects to the second saturable reactor 126 through a fifth diode 130 oriented to inhibit current from the second AC phase input 110 into the second saturable reactor 126. The third AC phase input 114 connects to the second saturable reactor 126 through a sixth diode 132 oriented to inhibit current from the third AC phase input 114 into the second saturable reactor 126.

The first saturable reactor 118 includes a respective first reactor inductor 134 for each of the first, second, and third AC phase inputs. The first saturable reactor 118 also includes a respective control winding 136 operatively associated with each of the respective first reactor inductors 134 for controlling DC output voltage to the first DC output 138. The second saturable reactor 126 similarly includes respective second reactor inductors 134 and control windings 136 for controlling DC output voltage to the second DC output 140.

A reactor controller 142 is operatively connected to the first saturable reactor 118 and to the second saturable reactor 126 to regulate DC output voltage to the first and second DC outputs 138, 140. The reactor controller 142 controls saturation of the inductors 134 in the reactors 118 and 126 by controlling the control windings 136.

The first saturable reactor 118 connects to the first DC output 138 through a first inductor 144. The second saturable reactor 126 connects to the second DC output 140 through a second inductor 146. A first impedance 148, e.g. a resistor, connects a node 150 between the first saturable reactor 118 and the first inductor 144 to ground 152. A second impedance 155, e.g. a resistor, connects a node 156 between the second saturable reactor 126 and the second inductor 146 to ground 155. A first grounded diode 158 connects the node 150 to ground 155, and is oriented to impede current flowing to ground 155 through the first diode 158. A second grounded diode 160 connects the node 156 to ground 155, and is oriented to impede current flowing to ground 155 through the second diode 160.

A neutral line 162 is configured to connect to the PMG neutral point 116, wherein the neutral line 162 connects to a node 164 between the first DC input 138 and the second DC output 140. A first capacitor 166 is connected between the first DC output 138 and the neutral line 162. A second capacitor 168 is connected between the second DC output 140 and the neutral line 162. The node 164 is connected to the first capacitor 166, the second capacitor 168, and the neutral line 162. This node 164 can be connected to ground 155, as shown in FIG. 1, so a negative DC voltage can be output from the second DC output 140, and a positive DC voltage can be output from the first DC output 138. The neutral point 116 is therefore connected as a floating point between the first and second DC outputs 138, 140.

Figure 2:
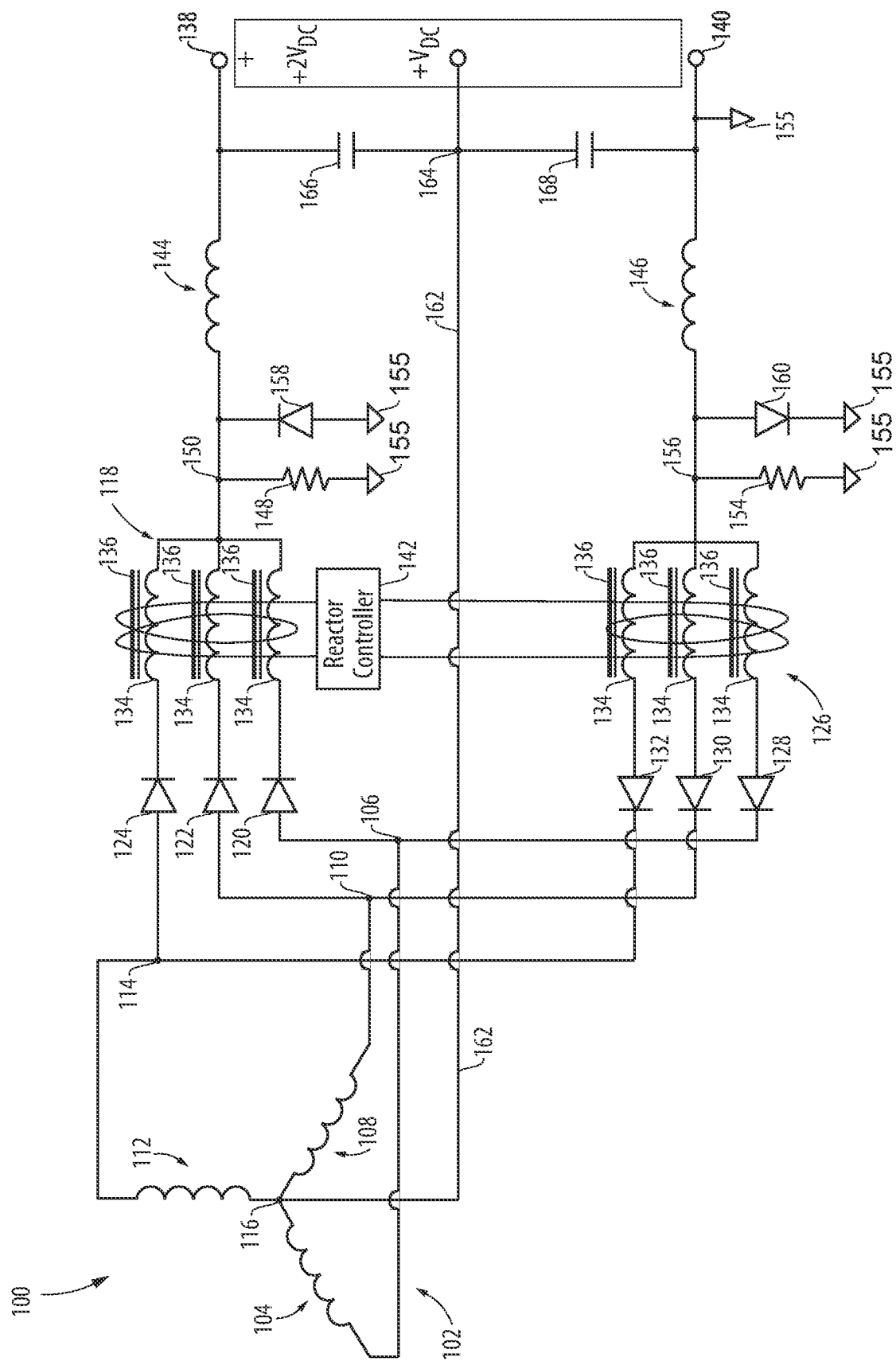
FIG. 2 is a schematic view of the system of FIG. 1 with a different configuration for the neutral point of the PMG.

It is also contemplated as shown in FIG. 2 that the second DC output 140 can be connected to ground 155 instead. The node 164 in this case is configured to output an intermediate positive DC voltage (VDC, half way between the voltage +2VDC of the DC output 138 and ground of the DC output 140).

By having the second reactor 126, the negative half of the PMG output voltage can be utilized to establish a DC link. The topology shown in FIG. 1, assume a +/− VDC, where the center point (node 164) of the output is the reference or return path. By utilizing the negative half of the waveform, the PMG size can be reduced relative to systems with only one saturable reactor. Another potential benefit of this topology is that it lends itself towards variable frequency systems. The reactors 118 and 126 can be to be sized for the highest operating speed, but in order to help limit voltage, one half of the reactor can be turned off for high speed operation. This can allow the PMG sizing to be reduce and allow for better voltage control at high speed. It is also contemplated that the system 100 can be configured to limit voltage output for high speed range (e.g., 2:1) applications while limiting the PMG sizing. The reactor topology disclosed herein can also be more cost effective than switching power supplies.

The methods and systems of the present disclosure, as described above and shown in the drawings, provide for direct current (DC) power from an alternating current (AC) generator, e.g. aboard an aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A power supply system comprising:
a first AC phase input configured to connect to a first phase of a generator;
a second AC phase input configured to connect to a second phase of the generator;
a third AC phase input configured to connect to a third phase of the generator;
a first saturable reactor electrically connected to the first AC phase input, to the second AC phase input, and to the third AC phase input, wherein the first saturable reactor is electrically connected to a first DC output;
a second saturable reactor electrically connected in parallel with the first saturable reactor to the first AC phase input, to the second AC phase input, and to the third AC phase input, wherein the second saturable reactor is electrically connected to a second DC output;
a neutral line configured to connect to a PMG neutral point, wherein the neutral line connects to a node between the first DC input and the second DC output;
a first capacitor connected between the first DC output and the neutral line; and
a second capacitor connected between the second DC output and the neutral line.

2. The system as recited in claim 1, wherein a node connected to the first capacitor, the second capacitor, and the neutral line is connected to ground so a negative DC voltage can be output from the second DC output, and a positive DC voltage can be output from the first DC output.

3. The system as recited in claim 1, wherein the second DC output is connected to ground, and a node connected to the first capacitor, the second capacitor, and the neutral line is configured to output an intermediate positive DC voltage, and wherein the first DC output is configured to output a higher positive DC voltage than the intermediate positive DC voltage.

4. The system as recited in claim 1, wherein the first saturable reactor connects to the first DC output through a first inductor, and wherein the second saturable reactor connects to the second DC output through a second inductor.

5. The system as recited in claim 1, further comprising a reactor controller operatively connected to the first saturable reactor and to the second saturable reactor to regulate DC output voltage to the first and second DC outputs.

6. The system as recited in claim 1, wherein:
the first AC phase input connects to the first saturable reactor through a first diode oriented to inhibit current from the first saturable reactor into the first AC phase input;
the second AC phase input connects to the first saturable reactor through a second diode oriented to inhibit current from the first saturable reactor into the second AC phase input; and
the third AC phase input connects to the first saturable reactor through a third diode oriented to inhibit current from the first saturable reactor into the third AC phase input.

7. The system as recited in claim 6, wherein:
the first AC phase input connects to the second saturable reactor through a fourth diode oriented to inhibit current from the first AC phase input into the second saturable reactor;
the second AC phase input connects to the second saturable reactor through a fifth diode oriented to inhibit current from the second AC phase input into the second saturable reactor; and
the third AC phase input connects to the second saturable reactor through a sixth diode oriented to inhibit current from the third AC phase input into the second saturable reactor.

8. The system as recited in claim 1, wherein the first saturable reactor includes a respective first reactor inductor for each of the first, second, and third AC phase inputs, and wherein the first saturable reactor includes a respective control winding operatively associated with each of the respective first reactor inductors for controlling DC output voltage to the first DC output.

9. The system as recited in claim 8, wherein the second saturable reactor includes a respective second reactor inductor for each of the first, second, and third AC phase inputs, and wherein the first saturable reactor includes a respective control winding operatively associated with each of the respective second reactor inductors for controlling DC output voltage to the second DC output.

10. The system as recited in claim 1, further comprising a permanent magnet generator (PMG) with a first phase connected to the first AC phase input, a second phase connected to the second AC phase input, and a third phase connected to the third AC phase input.

11. The system as recited in claim 10, wherein the PMG includes a neutral point connected between the first phase, second phase, and third phase of the PMG, wherein the neutral point is connected as a floating point between the first and second DC outputs.

12. A power supply system comprising:
a first AC phase input configured to connect to a first phase of a generator;
a second AC phase input configured to connect to a second phase of the generator;
a third AC phase input configured to connect to a third phase of the generator;
a first saturable reactor electrically connected to the first AC phase input, to the second AC phase input, and to the third AC phase input, wherein the first saturable reactor is electrically connected to a first DC output;
a second saturable reactor electrically connected in parallel with the first saturable reactor to the first AC phase input, to the second AC phase input, and to the third AC phase input, wherein the second saturable reactor is electrically connected to a second DC output, wherein the first saturable reactor connects to the first DC output through a first inductor, and wherein the second saturable reactor connects to the second DC output through a second inductor;
a first impedance connecting a node between the first saturable reactor and the first inductor to ground; and
a second impedance connecting a node between the second saturable reactor and the second inductor to ground.

13. The system as recited in claim 12, further comprising:
a first grounded diode connecting the node between the first saturable reactor and the first inductor to ground, oriented to impede current flowing to ground through the first diode; and
a second grounded diode connecting the node between the second saturable reactor and the second inductor to ground, oriented to impede current flowing to ground through the second diode.

* * * * *